United States Patent Office 2,747,711
Patented May 29, 1956

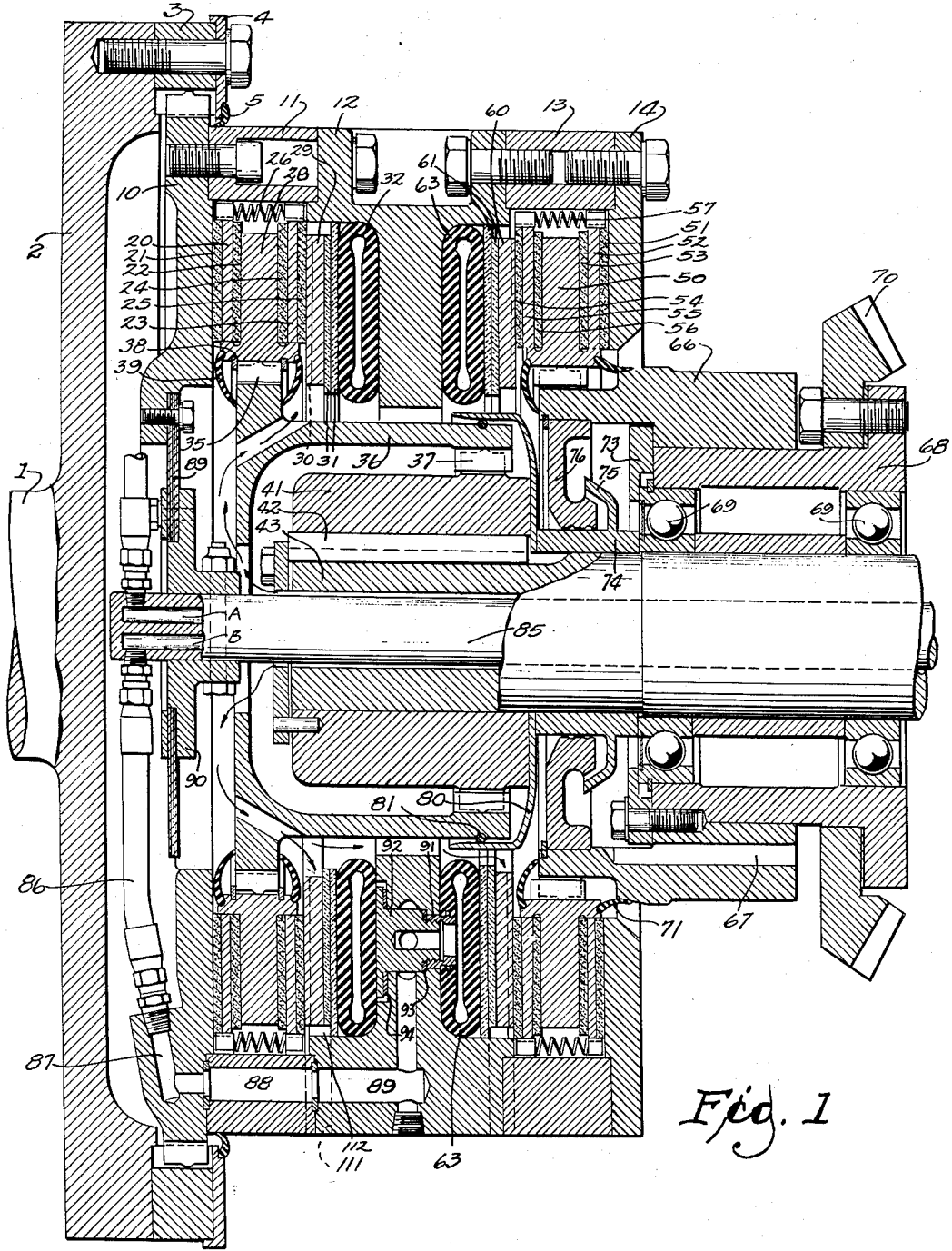

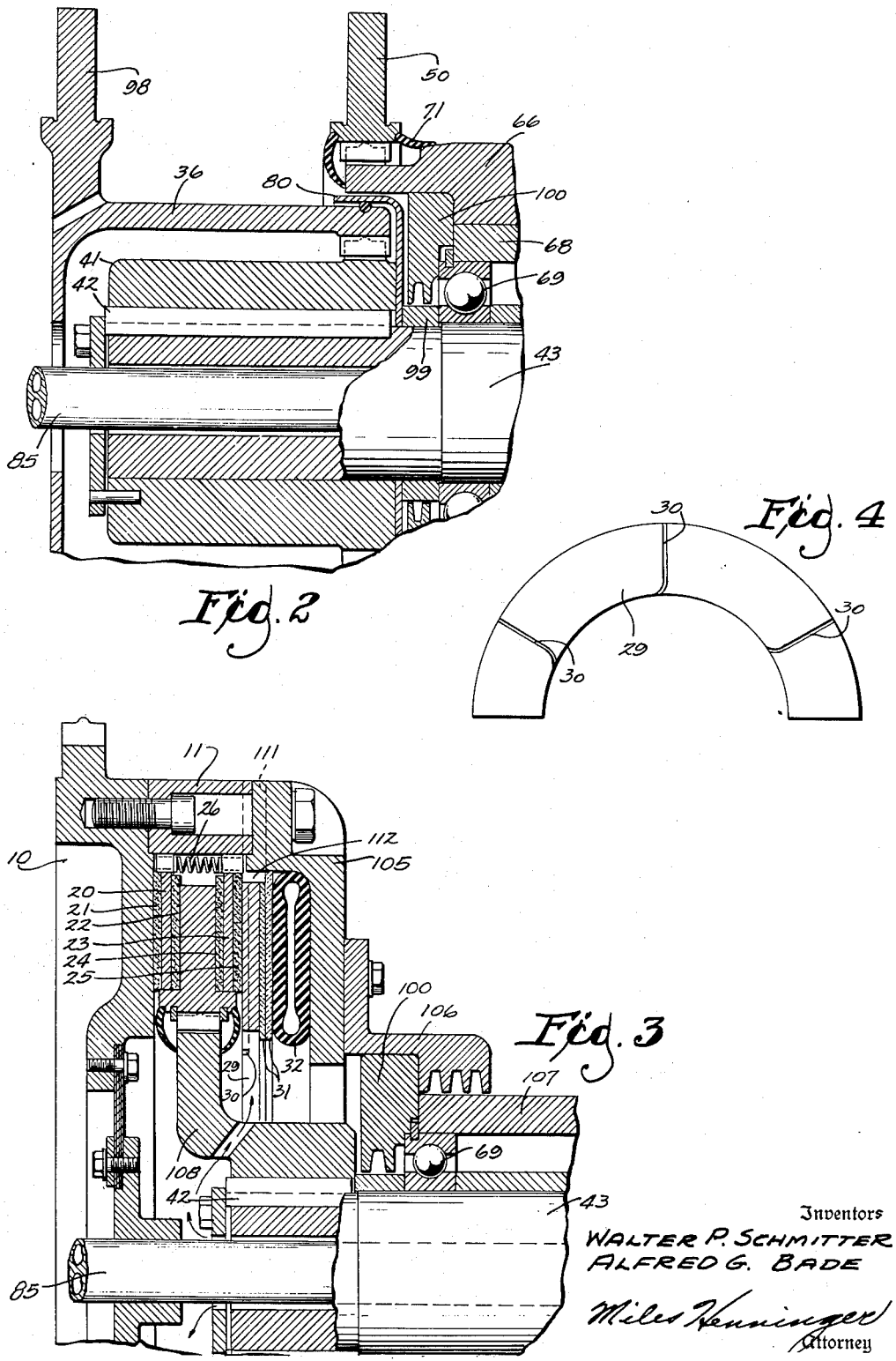

2,747,711

MULTIPLE CLUTCH-COUPLING UNIT

Walter P. Schmitter and Alfred G. Bade, Milwaukee, Wis., assignors to The Falk Corporation, Milwaukee, Wis., a corporation of Wisconsin Application June 30, 1950, Serial No. 171,412

8 Claims. (Cl. 192—87)

This invention relates to improvements in fluid pressure operated clutches, and in clutch-coupling units for connecting and disconnecting a source of power with different shafts of a reversible gear set whereby power may be taken for delivery by the gear set in either direction of rotation.

When multiple-plate clutches are operated by pressure of an expansible and collapsible chamber receiving fluid under pressure, the chamber is preferably made of resilient material which is however affected by heat, and heat insulating disks are interposed between the friction plates of the clutch and the flexible chamber. However, such heat insulating disks are inadequate particularly if the clutch is subjected to such service as to cause the generation of material amounts of heat.

Further, the various rotating elements of such clutches produce partial vacuum conditions at various locations inside the clutch housing, which have a tendency to draw lubricant away from the dental or other flexible couplings by which such clutches are usually connected to the driven shafts, and to draw lubricant out of gear sets associated with the clutches.

In many drives and especially in reversible drives for either ships or land vehicles, it is necessary to place the clutches and couplings of the drive in restricted space between the power input shaft and a gear set connected with the power output shaft. Maintenance of such drives requires that the various sub-combinations or units of the drive be fully accessible and therefore that the clutch-coupling unit be readily removable from the drive without disturbing the other units. Such drive should also be capable of installation without danger of either angular or parallel misalignment, should not be subject to such misalignment during operation and should be removable and replaceable without danger of such misalignment.

In fluid pressure operated clutch-coupling units, it is highly desirable to separate the clutching and coupling functions and to avoid reaction of the elements performing one function on the elements performing the other function. Fluid pressure operated clutches are use-proved constructions and will operate well in clutch-coupling units if the units are so designed as to limit the forces acting on the clutch actuating chamber to only compressive forces and to keep the fluid pressed actuating chamber of the clutch cool without affecting lubrication of parts.

Care must be taken that the centrifugal forces acting on the unit do not adversely affect operation of the unit as a whole or the action of any individual elements of the clutches or of the couplings. The coupling parts especially, of a unit such as disclosed herein, should be allowed to assume their own operating position to avoid stressing of any parts otherwise than due to their own functioning.

It is therefore one object of the present invention to provide a fluid pressure operated clutch in which the heat generated by the clutch plates is effectively barred from the flexible chamber for pressing the clutch plates together.

A further object of the invention is to provide a fluid pressure operated clutch unit in which lubricant is more readily retained about the surfaces to be lubricated than heretofore, and is kept from contact with the clutch operated flexible chamber.

Another object of the present invention is to provide a clutch-coupling unit which may be interposed between and supported only from the output shaft of a prime mover and the input shafts of a reversible gear set, for applying power to the gear set in either direction of rotation, and which may be installed and maintained with no attention to alignment of the clutch-coupling unit with the prime mover shaft or the gear set shafts.

Another object of the invention is to provide a clutch-coupling unit in which a plurality of fluid pressure operated clutches are combined with a plurality of flexible couplings relieving the clutches from shock and vibration, allowing the clutch and coupling parts to assume their best operating position and avoiding the transmission of operating stresses between clutches and couplings and especially to the actuating means for such clutches.

Another object of the present inveniton is to provide a fluid pressure operated clutch and flexible coupling unit in which the clutch elements and the coupling elements are not subjected to stresses other than those occurring in the several functional sub-combinations of elements themselves.

A further object of the invention is to provide a multiple clutch and multiple coupling unit in which expansible and collapsible tubes to be expanded by fluid pressure, are severally used to actuate the multiple plates of the various clutches and are so arranged and related to other parts of the unit as to avoid imposing torsional stresses on the tubes and which include means for cooling of such tubes while improving lubrication of the various bearings and inter-engaging parts of the unit.

Another object of the invention is to provide a multi-clutch and multi-coupling unit in which the annular clutch plates are supported both on their inner and outer peripheries and have springs acting thereon tending to separate the plates, the supporting of the plates and locating of the springs being such as to minimize the effect of centrifugal force on movement of such parts by the several clutch actuating means.

And a further object of the invention is to provide a clutch-coupling unit for support only by connection between a driving shaft and a driven shaft but which allows removal and replacement of the parts most subject to wear in such units, without dismantling the major portions of the unit.

Objects and advantages other than those above set forth will be apparent from the following description when read in connection with the accompanying drawing in which:

Fig. 1 is an axial vertical cross-section of a clutch-coupling unit embodying the present invention, shown as connected with the output shaft of a prime mover and as including some shafts and one gear of a reversible gear set.

Fig. 2 is a view similar to Fig. 1 but shows only a modification of several of the coupling elements, to combine elements and otherwise simplify construction of the unit.

Fig. 3 is an axial vertical cross-section of a clutch-coupling unit embodying the present invention and eliminating one of the flexible couplings for connecting a clutch with a power output shaft; and Fig. 4 is a fragmentary elevational view of one element of each of the several clutch structures.

Generally, the present clutch-coupling unit includes a power driven casing for one or more fluid pressure operated, multiple plate clutches to be severally and flexibly coupled with one or more power output shafts. The clutches severally comprise a plurality of plates driven by the casing and urged apart by springs, disks engageable with the driven plates and with a driving plate, a flexible chamber to be expanded by fluid pressure for pressing the plates and disks together, and means for at least minimizing the transmission of heat from the plates to the flexible chamber. The driving plate is flexibly coupled with the shaft to be driven and such flexible coupling may be torsionally resilient or may float to minimize the stresses imposed on either the clutches or the coupling parts other than those due to the operation of such parts themselves.

The present multiple clutch-coupling unit is especially designed for placing between the output shaft of a prime mover such as a diesel engine and a reversible gear set such as shown in Patent No. 2,304,030 issued to Walter P. Schmitter on December 1, 1942. The engine shaft flange is connected by a dental coupling with the outer or casing portion of a clutch-coupling unit, the casing itself forming some portions of two multi-plate clutches of the type indicated above. The clutches are selectively supplied with fluid under pressure for selectively pressing on the clutch plates dependent on the direction of rotation desired for the power delivered from the gear set.

The clutches are severally flexibly coupled with various shafts of the gear set, which extend into the casing. One clutch is connected by a dental coupling with a floating member which is itself connected by a dental coupling with a hollow shaft delivering power to one group of gears in the gear set. Another clutch is connected by a dental coupling with another hollow shaft on which is mounted one of the gears of the gear set.

Referring specifically to the drawing by reference characters, the numeral 1 designates the output shaft of a prime mover such as a diesel engine, which is provided with a flange 2 on which are mounted a ring gear 3 forming one part of a dental coupling, and a closure plate 4 with a flexible seal 5, for engagement with a clutch-coupling unit outer or casing portion.

The outer or casing portion of the unit includes a substantially annular plate 10 with peripheral teeth engageable with the teeth on the dental coupling ring 3. Fixed to plate 10 is a short cylinder 11 on which is fixed a flanged or T-shaped cylinder 12, the leg of the T extending inwardly from the cylinder 11 to form a partial partition for the clutch-coupling casing. Another short cylinder 13 is fixed on the other end of the head of the T-partition 12 and an annular plate 14 is fixed to member 13. It will be noted that parts 10 to 14, inclusive, are shaped to form a cylindrical casing or housing with a partial central partition and with all parts so interlocked as to avoid relative movement therebetween as the casing is rotated by the shaft 1. Cylinders 11 and 13 are each formed with two sets of internal teeth for engagement with clutch parts as will be described.

Plate 10, cylinder 11, partition 12, cylinder 13 and plate 14 coact to define the annular spaces in which are individually mounted fluid pressure operated clutches. One clutch is located in the space defined by parts 10, 11 and 12 and comprises plates 20 and 23 with peripheral teeth severally engaging the sets of internal teeth on cylinder 11 and therefore moving as the casing moves. Plates 20 and 23 are urged apart by a number of compression springs 26 acting between the plates at the outer peripheries thereof and pressing the plates toward the casing parts and the sides of the annular space occupied by the clutch. A plurality of pairs of friction disks 21, 22 and 24, 25 are severally arranged on the sides of the plates 20 and 23 to form therewith separate sets of plates supported at and centered by their inner peripheries on the bar of a T-shaped plate 28 extending between the sets of clutch plates above described, the T-bar having teeth formed therein to provide a ring gear. It will be noted that the set of clutch plates 20, 21, 22 and 23, 24, 25 are annular and are severally supported at their inner peripheries on the two parts of the T-bar plate 28.

The clutch parts above described are spaced from other parts of the clutch by a plate 29 having a plurality of substantially radial passages 30 therein (as shown in Fig. 4) and by disks 31 of heat-insulating material which bear on an expansible and collapsible chamber or tube 32 seating on a side surface of the casing partition plate 12. It will be understood that, fluid such as air under pressure may be admitted to tube 32 for expansion of the tube to press the several sets of clutch plates together and against plate 28 to cause the transmission of power from the casing 10—14 to the clutch plate 28.

The teeth on clutch plate 28 engage with external teeth 35 on one end of a substantially cylindrical, and fully floating dental coupling member 36 having a second set of teeth 37 adjacent the other end thereof. The teeth of plate 28 and the teeth 35 of floating member 36 are held against relative lateral movement of the teeth, by snap rings 38 inserted into the plate 28 and such teeth are enclosed along the sides thereof by flexible and resilient sealing strips 39. The teeth 37 of floating coupling member 36 engage with teeth on a coupling member 41 which is fixed as by a key 42, on a hollow shaft 43 which is one of the shafts of the gear set and extends into the casing 10—14.

Hence, when tube 32 is inflated to cause frictional engagement of clutch plates and disks 20—25 and 28—31, shaft 43 will be rotated to drive the gear set in one direction which is herein assumed to be the "forward" direction.

A second fluid pressure operated multi-plate clutch is mounted in the annular space defined by casing partition 12, cylinder 13 and end plate 14 and comprises an annular T-shaped dental coupling and clutch plate 50 extending into the annular space with the T-bar at the inner periphery of such plate and internally toothed. A set of clutch plates and disks 51, 52 and 53 is arranged between the casing end plate 14 and one side of the plate 50. Another set of clutch plates and disks 54, 55 and 56 is mounted on the side of plate 50 adjacent casing partition 12, the inner peripheral surface of the several sets of plates and disks being supported on the T-bar of the plate 50. Plates 52 and 55 are toothed at their outer periphery for meshing with the several sets of internal teeth on the casing member 13. The above several sets of clutch plates and disks are urged apart by springs 57 located adjacent the interior surface of casing 10—14.

The set 54, 55, 56 of clutch plates bears on an impeller plate 60 provided with substantially radial passages therein, and on heat-insulating disks 61, which bear on an expansible and collapsible tubular chamber 63 seated on casing partition 12.

It will be noted that the several sets of plates and disks 20, 21, 22, etc. are positioned and supported at both their inner and outer peripheries but are readily movable to provide for uniform contacts therebetween. The springs 26 and 57 are adjacent the inner surface of the casings and are laterally restrained only by such wall so as to obtain as nearly as possible uniform centrifugal force thereon and to minimize interference of such force with their characteristic spring action.

The teeth of clutch plate 50 engage with teeth on a hollow shaft 66 which extends into the clutch casing and which is fixed by a key 67 to another hollow shaft 68. The shaft 68 is mounted on axially spaced bearings 69 on shaft 43 and is flanged for attachment thereto of a gear 70 which forms a part of the gear set to be driven and is in fact a part of the "reverse" gearing of such set. Lubricant is sealed into the space about the meshing teeth of plate 50 and shaft 66 by flexible and resilient strips 71.

Movement of bearings 69 toward the left or into the clutch casing, is resisted by a ring 73 fixed to shafts 66 and 68 and aiding in preventing axial movement between such shafts. Such movement of bearings 69 is further prevented by a collar 74 mounted on shaft 43 and having a flange 75 coacting with a ring 76 mounted interiorly in shaft 66 and flanged to coact with collar flange 75 in forming a seal for preventing the drawing of lubricant out of bearings 69 by "pumping action" of the various clutch and coupling rotating parts, which is well known in the clutch art. One end of the collar 74 seats on a bell 80 enclosing one end of dental coupling members 36 and 41, the bell bearing on an O-ring 81 to provide a seal for retaining lubricant about the meshing teeth of the coupling members 36 and 41.

Fluid under pressure is supplied to and discharged from clutch actuating tubes 32 and 63 by way of one of two passages A or B formed in a conduit 85 extending axially through the hollow shaft 43 of the gear set and into the clutch-coupling unit. The conduit is flexibly supported at one end on the dental coupling plate 10, the other end of the tube 85 being supported for rotation as shown in Patent 2,304,030 issued to Walter P. Schmitter, December 1, 1942. Flexible connection of the air conduit 85 with the coupling plate 10 is obtained by mounting on the plate 10 a plurality of flexible washer-like elements 89 and connecting such elements at their inner periphery with the flange of a hub 90 fixed on air conduit 85.

Air or other pressure fluid is admitted to and discharged from either conduit passage A or B by a valve construction, such as shown in the above patent or in Patent 2,462,006 issued to Carl Schmitter et al. February 15, 1949. The air conduit passages A and B are severally connected with conduits 86 which are in turn severally connected with passages 87, 88 and 89 formed in the various casing parts 10, 11 and 12 and leading to an inlet structure for one of the expansible air tubes, only the inlet structure for air tube 63 being shown.

Such air inlet structure comprises an internally threaded nipple 91 fixed in the air tube 63 to receive the threaded end of an inlet member 92 extending through a counter-bore and bore intersecting the air passage 89. The inlet member 92 is sealed to the nipple 91 by a gasket 93 and to the casing partition 12 by a gasket 94. The inlet member 92 has a flanged end substantially filling the counter-bore in casing partition 12 and coacting with the surface thereof to provide a portion of the reacting surface for the air tube 32, which surface is sufficiently continuous and planar to avoid interference with the action of such tube. The air passage structure to air tube 32 is similar to that described above and is not shown for the sake of simplicity of the drawings.

In the modification shown in Fig. 2, the floating member 36 is formed with a relatively wide flange 98 in place of the former narrower and toothed flange 35. Flange 98 is now shaped to provide a peripherally T-shaped section of the proportions of the former clutch plate 28 to extend between the sets of clutch plates and disks 20, 21, 22 and 23, 24, 25 and thus serve as the clutch plate 28 also. Combining the functions of the floating member 36 and the clutch plate 28 eliminates the formation of two sets of teeth to provide one dental coupling, the floating member 36 being now preferably made sufficiently torsionally resilient to have shock and vibration damping qualities otherwise provided by the dental coupling now eliminated.

To compensate for the necessary increase in axial dimensions of the floating member 36 for obtaining the greater torsional resilience, the shaft 66 is shortened which reduces the space available for sealing the bearings 69. A shorter and plain spacer collar 99 is now substituted for the flanged spacer collar 74, 75, and a ring 100 with a groove in the inner periphery thereof is substituted for the ring 73, the groove coacting with the collar 99 to form a labyrinth seal for retaining lubricant about and in the bearings 69. It will be noted that the dental coupling for the floating member 36 and shaft member 41 is now brought into alignment with the dental coupling between the clutch plate 50 and the shaft 66, thus providing for articulation of such couplings about a common point on the axis of the shaft 43. Such relationship of the above dental couplings avoids the transmission of stresses to the clutches even though another dental coupling is eliminated from the unit.

A single clutch coupling construction is shown in Fig. 3 which is essentially the same as one half of the structure above described and which employs some parts indentical with the parts described above, which parts are therefore designated by the reference numerals previously applied thereto. Plate 10 and cylinder 11 again coact with each other and with an end plate 105 to form annular casing spaces for receiving the clutch parts 20-32 inclusive. A ring 106 with a grooved flange completes the casing and extends adjacent the casing part 107 in which are mounted the bearings 69 supporting the shaft 43. A dental coupling member 108 is keyed as at 42 on the shaft 43 and its teeth mesh with the teeth of the coupling T-plate 28.

In operation, air flows through the unit as is indicated by arrows in Figs. 1 and 3 of the drawing. The air enters the unit from about one end of conduit 85 and flows through the space between the shaft 43 and the air conduit 85 from which it discharges into the space within floating member 36 and coupling member 108, respectively. Air flows from interiorly of the floating and coupling members through ports in the flanges thereof, into spaces between the floating and coupling members and the several clutches, the ports being formed at an angle to the axis of the unit and being of considerable length to have an impelling action on the air flow. The air is positively pumped from such spaces by the action of radial passages 30 in the disks 29 and 60 which act as impeller passages as in a centrifugal pump. The air discharges from the unit by way of casing ports 111 which open from peripheral spaces 112 at the discharge ends of the radial passages of the several impellers. It has been found that a relatively small number of impeller passages in the form of plain radial grooves provides adequate pumping action for a given size unit under given conditions. However, if it is desired to use the same unit under more severe operating conditions, it is necessary only to increase the number of impeller passages or to shape the same number of passages more nearly like the passages in an impeller of the usual centrifugal pump. The quantity of air drawn through the unit should of course be directly proportional to the service conditions imposed on the clutches, to provide adequate cooling of the clutch air tubes and other parts.

It will be seen that the present construction provides for complete separation of the clutching and coupling functions required in the unit for connecting a prime mover and a gear set for the purpose described. The dental couplings between the clutches and the driven shafts are not required to furnish support for either of the clutches, and the floating member is therefore free to position itself as required by positioning of other parts. A unit is thus provided which compensates for both angular and parallel misalignment of the driving shaft and the gear set driven shafts.

There can be no such "cocking" or positioning of the clutch parts as to cause friction at diagonally opposite inner and outer peripheral edges of the air tubes. The forces on the tubes are purely compressive and all torsional stresses on the air tubes are eliminated, which greatly increases the life of such tubes. Even when one of the dental couplings is eliminated as shown in Fig. 2, placing the other dental couplings in a line at right angles to the shaft axis to pivot about a common point about such axis, avoids transmission of any coupling stresses to the clutch parts.

The several sets of plates of the several clutches are supported both at their inner and outer peripheries and accordingly are not affected by centrifugal force.

The clutch plate separating springs are adjacent the wall of the clutch casing and are therefore under much more uniform centrifugal force than when the springs are located nearer the axis of the unit. The springs are not laterally restrained (except by the casing) but may assume different positions in their compressing and expanding movements. The spring characteristics are accordingly subjected to the minimum disturbance and the springs therefore provide uniform and predetermined action.

Utilization of ports and passages through various parts of the unit for the flow of air and to provide positive pumping action on such air flow, but without affecting lubrication of the unit, cools both the clutch air tubes and other clutch parts. The life of the air tubes and other clutch parts subject to deterioration due to overheating, is thus further improved. Such air flow also tends to keep the entire unit cooler and to permit a more compact design or use under more severe operating conditions than is otherwise possible. Providing a flow of air through the unit also eliminates partial vacua which would otherwise be set up in various parts of the unit, and thus avoids the former difficulties in retaining lubricant about the various sets of meshing teeth and the other lubricated parts.

A number of the various parts which are generally annular in shape, are split for easy removal and replacement so that parts such as the air tubes, may be replaced without dismantling an entire clutch-coupling unit.

Although but a few embodiments of the present invention have been illustrated and described, it will be apparent that various changes and modifications may be made therein without departing from the invention as defined in the appended claims.

We claim:

1. In a clutch, the combination of driving and driven clutch members severally comprising a housing and a plate disposed in said housing and rotatable therewith, means supporting one of said members for relative tilting action between said members, and fluid pressure-operable means in said housing for pressing said plate into frictional torque-transmitting relation with said housing.

2. In a clutch as defined in claim 1 wherein both of said members are tiltably supported.

3. In a clutch, the combination of driving and driven clutch members, means severally supporting said members for relative tilting action therebetween, plates connected with one of said members for rotation therewith and frictionally engageable with the other of said members, and fluid pressure-operable means carried by one of said members for forcing said plates into frictional torque-transmitting relation with the other of said members.

4. In a clutch for connecting a driving shaft with one of a plurality of driven members, a casing flexibly connected with the driving shaft, a plurality of plate-type clutches within said casing, one of the clutches being flexibly connected with one of the driven members, and a floating member within said casing and flexibly connected with another of said clutches and with another of the driven members.

5. In a clutch for connecting a driving shaft with one of a plurality of driven members, a casing flexibly connected with the driving shaft, a plurality of plate clutches within said casing, one of the clutches being flexibly connected with one of the driven members, and a floating member within said casing and flexibly connected with another of said clutches and with another of the driven members, said floating member being substantially centered relative to said casing for minimizing the effect of centrifugal force on the positioning thereof.

6. In a clutch unit for connecting a driving shaft with one of a plurality of driven shafts, a casing flexibly connected with one of the shafts, a plurality of sets of plates within and rotatable with said casing, a plate of one of said sets of plates being flexibly and severally connected with another of the shafts, each of the clutches including a plate having substantially radial grooves for aiding in air movement and maintaining atmospheric pressure throughout said casing, and a flanged floating member within said casing and flexibly connected with one of said sets of plates and with another of the shafts, said floating member flange having apertures therethrough for aiding in movement of air and maintaining atmospheric pressure throughout said casing.

7. In a clutch unit for connecting a driving shaft with one of a plurality of driven shafts, a casing flexibly connected with one of the shafts, a plurality of sets of plates within and rotatable with said casing, a plate of one of said sets of plates being flexibly connected with another of the shafts, each of said sets of plates including a plate having generally radial grooves curved at one end for aiding in maintaining atmospheric pressure in said casing, and a radially flanged floating member within the casing and flexibly connected with one of said sets of plates and with another of the shafts, the flange of said floating member having apertures at an angle to the radius thereof for aiding in maintaining atmospheric pressure throughout said casing.

8. In a clutch for connecting driving and driven shafts, the combination of clutch members comprising a casing and a plate disposed therein, a flexible connection between one of the shafts and said casing for supporting said casing for tilting movement relative to said plate, a second flexible connection between the outer shaft and the casing for supporting said casing for tilting movement relative to said plate, and fluid pressure-operable means in said casing for pressing said plate into frictional torque-transmitting relation with said casing.

References Cited in the file of this patent

UNITED STATES PATENTS

| Number | Name | Date |
|---|---|---|
| 918,652 | Bryan | Apr. 20, 1909 |
| 951,235 | Cottin | Mar. 8, 1910 |
| 1,233,561 | Dornfeld | July 17, 1917 |
| 1,671,443 | Norris | May 29, 1928 |
| 2,028,500 | Cook et al. | Jan. 21, 1936 |
| 2,055,014 | Manger | Sept. 22, 1936 |
| 2,097,856 | Fawick | Nov. 2, 1937 |
| 2,169,639 | Grote | Aug. 15, 1939 |
| 2,183,761 | Aspinwall et al. | Dec. 19, 1939 |
| 2,290,542 | Criley | July 21, 1942 |
| 2,298,645 | Jackes | Oct. 13, 1942 |
| 2,303,201 | Eason | Nov. 24, 1942 |
| 2,386,478 | Kraft | Oct. 9, 1945 |
| 2,395,459 | Carnagua | Feb. 26, 1946 |
| 2,396,361 | Browne | Mar. 12, 1946 |
| 2,467,829 | Hornbostel | Apr. 19, 1949 |
| 2,481,834 | Foster | Sept. 13, 1949 |
| 2,498,123 | Hobbs | Feb. 21, 1950 |
| 2,523,501 | Davies et al. | Sept. 26, 1950 |
| 2,524,311 | Fieux | Oct. 3, 1950 |
| 2,586,617 | Danly | Feb. 19, 1952 |
| 2,604,197 | Livermore | July 22, 1952 |
| 2,608,275 | Hobbs | Aug. 26, 1952 |

FOREIGN PATENTS

| Number | Country | Date |
|---|---|---|
| 17,511 | Great Britain | Dec. 1, 1910 |